US008255379B2

(12) United States Patent
Govindachetty et al.

(10) Patent No.: US 8,255,379 B2
(45) Date of Patent: Aug. 28, 2012

(54) CUSTOM LOCAL SEARCH

(75) Inventors: Narendranath Datha Govindachetty, Bangalore (IN); Tanuja Abhay Joshi, Pune (IN); Joseph Joy, Redmond, WA (US); Vibhuti Singh Sengar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 206 days.

(21) Appl. No.: 12/615,289

(22) Filed: Nov. 10, 2009

(65) Prior Publication Data

US 2011/0113064 A1 May 12, 2011

(51) Int. Cl.
*G06F 17/30* (2006.01)

(52) U.S. Cl. ......... 707/706; 707/708; 707/769; 707/771

(58) Field of Classification Search .......... 707/706–724, 707/688, 769, 771
See application file for complete search history.

(56) References Cited

U.S. PATENT DOCUMENTS

| | | | | |
|---|---|---|---|---|
| 6,564,213 | B1* | 5/2003 | Ortega et al. | 1/1 |
| 7,870,126 | B2* | 1/2011 | Lester et al. | 707/724 |
| 8,024,314 | B2* | 9/2011 | Wang et al. | 707/706 |
| 8,041,506 | B2* | 10/2011 | Bliss et al. | 701/443 |
| 8,060,406 | B2* | 11/2011 | Blegen | 705/14.58 |
| 2002/0078035 | A1* | 6/2002 | Frank et al. | 707/3 |
| 2002/0174124 | A1* | 11/2002 | Haas et al. | 707/100 |
| 2003/0233224 | A1* | 12/2003 | Marchisio et al. | 704/4 |
| 2004/0030706 | A1* | 2/2004 | Evans | 707/100 |
| 2004/0073538 | A1* | 4/2004 | Leishman et al. | 707/3 |
| 2004/0153373 | A1* | 8/2004 | Song et al. | 705/26 |
| 2004/0183800 | A1* | 9/2004 | Peterson | 345/440 |
| 2007/0006098 | A1* | 1/2007 | Krumm et al. | 715/825 |
| 2007/0078848 | A1* | 4/2007 | Sareen et al. | 707/5 |
| 2007/0112507 | A1* | 5/2007 | Bargeron et al. | 701/208 |
| 2007/0143318 | A1* | 6/2007 | Hendrey et al. | 707/100 |
| 2007/0233656 | A1* | 10/2007 | Bunescu et al. | 707/3 |
| 2007/0294284 | A1* | 12/2007 | Evans | 707/102 |
| 2008/0010259 | A1 | 1/2008 | Feng et al. | |
| 2008/0016040 | A1* | 1/2008 | Jones et al. | 707/3 |
| 2008/0021726 | A1* | 1/2008 | Evans et al. | 705/1 |
| 2008/0027745 | A1* | 1/2008 | Evans et al. | 705/1 |
| 2008/0065685 | A1* | 3/2008 | Frank | 707/102 |
| 2008/0065694 | A1 | 3/2008 | Qian | |
| 2008/0097966 | A1* | 4/2008 | Choi et al. | 707/3 |
| 2008/0126343 | A1* | 5/2008 | Frank et al. | 707/5 |

(Continued)

OTHER PUBLICATIONS

Ludford, et al.,"Capturing, Sharing, and Using Local Place Information", Retrieved at <<http://www-users.cs.umn.edu/~reid/papers/p1235-ludford.pdf>> in the proceedings of the SIGCHI conference on Human factors in computing systems, Apr. 28-May 3, 2007, pp. 1235-1244.

(Continued)

*Primary Examiner* — Hanh Thai

(57) ABSTRACT

A method described herein includes receiving a query that is configured by an issuer of the query to be utilized to retrieve a portion of local search content, wherein the local search content comprises a first dataset and a second data set, wherein the first dataset comprises a first entity and the second dataset comprises a second entity, and wherein the query comprises a first token and a second token. The method also includes parsing the query such that the first token of the query is mapped to the first entity in the first dataset and the second token of the query is mapped to the second entity in the second dataset. The method also includes returning search results based at least in part upon the parsing of the query.

20 Claims, 9 Drawing Sheets

U.S. PATENT DOCUMENTS

| | | | |
|---|---|---|---|
| 2008/0140348 A1* | 6/2008 | Frank | 702/181 |
| 2008/0222140 A1* | 9/2008 | Lagad et al. | 707/5 |
| 2008/0243821 A1 | 10/2008 | Delli Santi et al. | |
| 2008/0294678 A1* | 11/2008 | Gorman et al. | 707/102 |
| 2008/0307004 A1* | 12/2008 | O'Donnell | 707/104.1 |
| 2009/0019028 A1 | 1/2009 | Norris et al. | |
| 2009/0037403 A1* | 2/2009 | Joy et al. | 707/5 |
| 2009/0049038 A1* | 2/2009 | Gross | 707/5 |
| 2009/0049408 A1* | 2/2009 | Naaman et al. | 715/835 |
| 2009/0100342 A1* | 4/2009 | Jakobson | 715/733 |
| 2009/0111487 A1* | 4/2009 | Scheibe | 455/456.6 |
| 2009/0115785 A1* | 5/2009 | Grandhi et al. | 345/440 |
| 2009/0138445 A1* | 5/2009 | White et al. | 707/3 |
| 2009/0157635 A1* | 6/2009 | Fuchs et al. | 707/3 |
| 2009/0319556 A1* | 12/2009 | Stolte et al. | 707/102 |
| 2009/0327078 A1* | 12/2009 | Ohazama et al. | 705/14.54 |
| 2010/0058196 A1* | 3/2010 | Krishnan et al. | 715/747 |
| 2010/0063877 A1* | 3/2010 | Soroca et al. | 705/14.45 |
| 2010/0114854 A1* | 5/2010 | Lee | 707/707 |
| 2010/0299370 A1* | 11/2010 | Otto | 707/803 |
| 2011/0040733 A1* | 2/2011 | Sercinoglu et al. | 707/688 |
| 2011/0093458 A1* | 4/2011 | Zheng et al. | 707/724 |

OTHER PUBLICATIONS

Purves, et al., "The Design and Implementation of SPIRIT: A Spatially-Aware Search Engine for Information Retrieval on the Internet", Retrieved at <<http://www.dcs.gla.ac.uk/~hideo/pub/ijgis07/ijgis07.pdf>>, in the proceedings of International Journal of Geographical Information Science, Jan. 2007, vol. 21, No. 7, pp. 1-58.

Himmelstein, Marty, "Local Search: The Internet Is the Yellow Pages", Retrieved at << http://www.metacarta.com/Collateral/Documents/English-US/r2026.pdf>>, Feb. 2005, vol. 38, No. 2, pp. 26-34.

Christen, et al., "A Probabilistic Geocoding System based on a National Address File", Retrieved at <<http://datamining.anu.edu.au/publications/2004/aus-dm2004.pdf>> pp. 1-13.

Chaudhuri, et al., "Robust and Efficient Fuzzy Match for Online Data Cleaning", Retrieved at <<http://research.microsoft.com/pubs/75996/bm_sigmod03.pdf>> in the proceedings of SIGMOD international conference on Management of data, Jun. 9-12, 2003, pp. 313-324.

Chen, et al., "Efficient Query Processing in Geographic Web Search Engines", Retrieved at <<http://cis.poly.edu/suel/papers/geoquery.pdf>> in the proceedings of SIGMOD international conference on Management of data, 2006, pp. 277-288.

Gargantini, Irene, "An Effective Way to Represent Quadtrees", Retrieved at <<http://portal.acm.org/ft_gateway.cfm?id=358741&type=pdf&coll=GUIDE&dl=GUIDE&CFID=47808603&CFTOKEN=13832287>> Dec. 1982, vol. 25, No. 12, pp. 905-910.

"Google Custom Search", Retrieved at <<http://www.google.com/coop/cse/>> Aug. 18, 2009, p. 1.

Joshi, et al., "Crosslingual Location Search", Retrieved at <<http://portal.acm.org/ft_gateway.cfm?id=1390372&type=pdf&coll=GUIDE&dl=GUIDE&CFID=47808760&CFTOKEN=17302276>> in the proceedings of the 31st annual international ACM SIGIR conference on Research and development in information retrieval, Jul. 20-24, 2008, pp. 211-218.

Joy, Joseph, "Robust Location Search", Retrieved at <<http://research.microsoft.com/apps/pubs/default.aspx?id=70559>>, Mar. 1, 2008, p. 1.

Jahn, Paul, "Still Together—Search engines and Internet Yellow Pages", Retrieved at <<http://www.searchengineguide.com/senews/005928.html>> Aug. 18, 2009, pp. 1-2.

Lieberman, et al., "STEWARD: Architecture of a Spatio-Textual Search Engine", Retrieved at <<http://www.cs.umd.edu/~hjs/pubs/steward-acmgis2007.pdf>>, 15th ACMGIS'07, Nov. 7-9, 2007, pp. 186-193.

Manning, et al., "Introduction to Information Retrieval.", Retrieved at <<http://nlp.stanford.edu/IR-book/pdf/irbookonlinereading.pdf>>, Apr. 1, 2009, pp. 581.

"Microsoft SQL Server", Retrieved at <<http://www.microsoft.com/sqlserver/>>, Aug. 18, 2009, p. 1.

Sengar, et al., "Robust Location Search from Text Queries.", Retrieved at <<http://portal.acm.org/ft_gateway.cfm?id=1341044&type=pdf&coll=GUIDE&dl=GUIDE&CFID=47809522&CFTOKEN=71345805>>, Proceedings of the 15th International Symposium on Advances in Geographic Information Systems, ACMGIS'07, Nov. 7-9, 2007, pp. 8.

"The First Law of Geography.", Retrieved at <<http://en.wikipedia.org/wiki/First_law_of_geography>>, Aug. 18, 2009, p. 1.

Zhou, et al., "Hybrid Index Structures for Location based Web Search.", Retrieved at <<http://portal.acm.org/ft_gateway.cfm?id=1099584&type=pdf&coll=GUIDE&dl=GUIDE&CFID=47809658&CFTOKEN=75987375>>, CIKM'05, Oct. 31-Nov. 5, 2005, pp. 155-162.

* cited by examiner

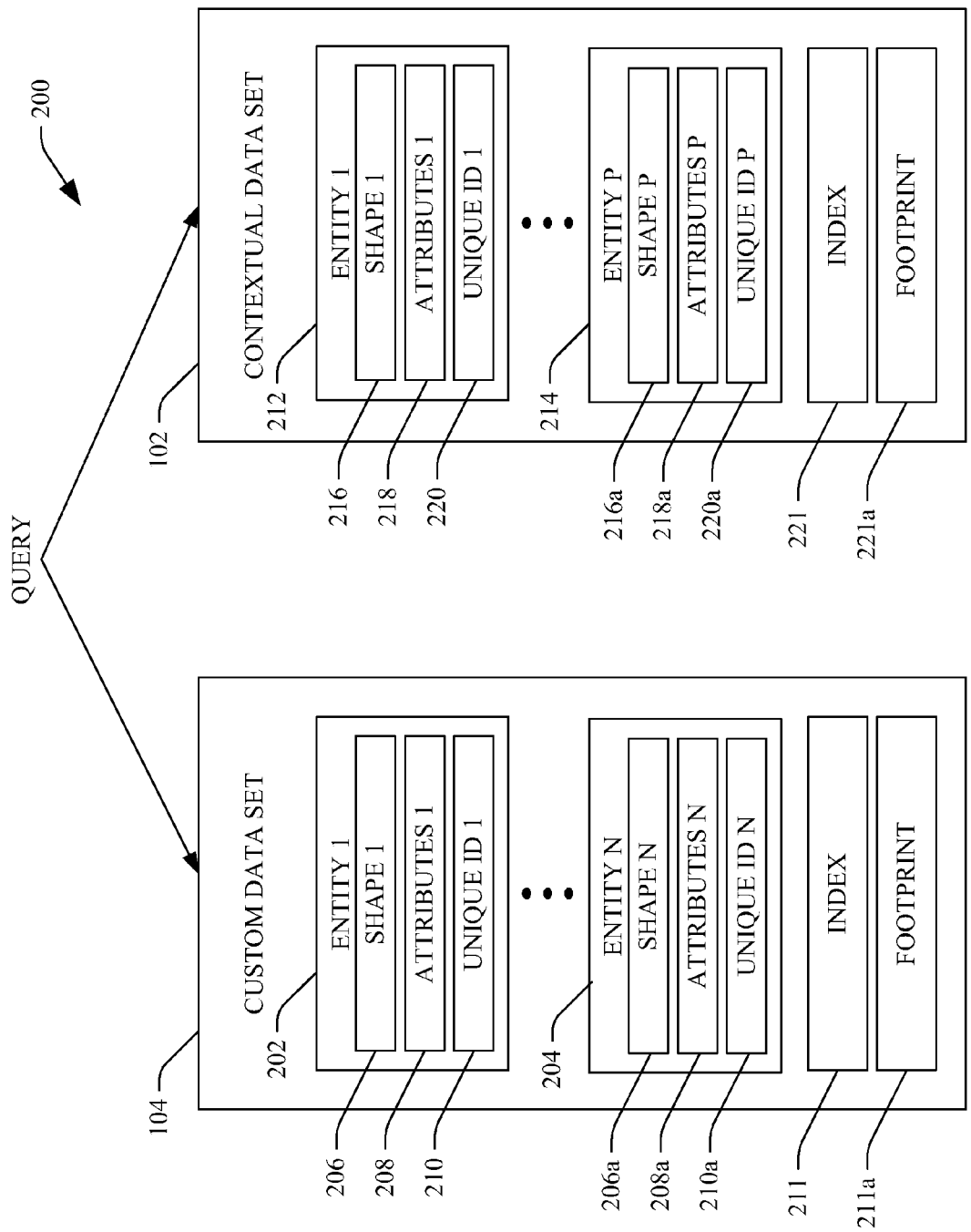

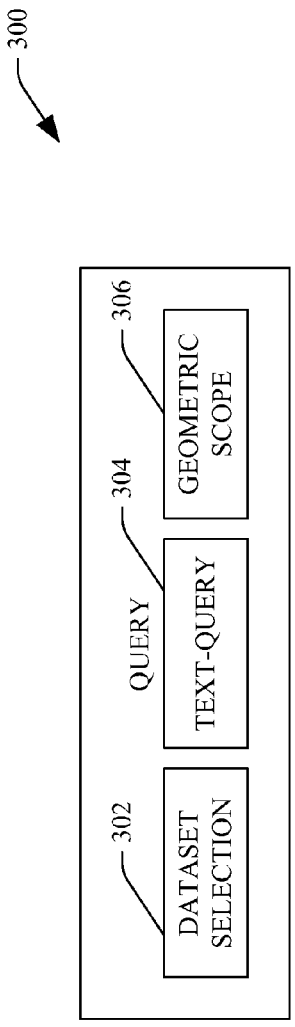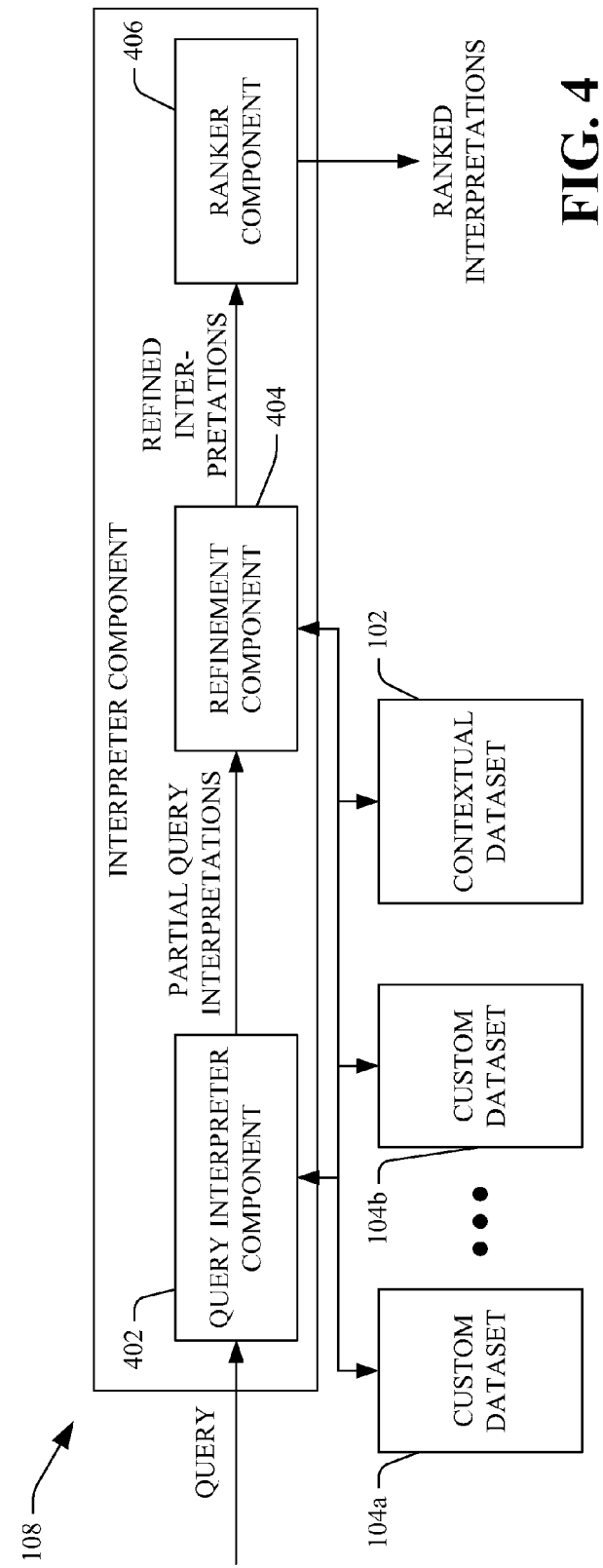

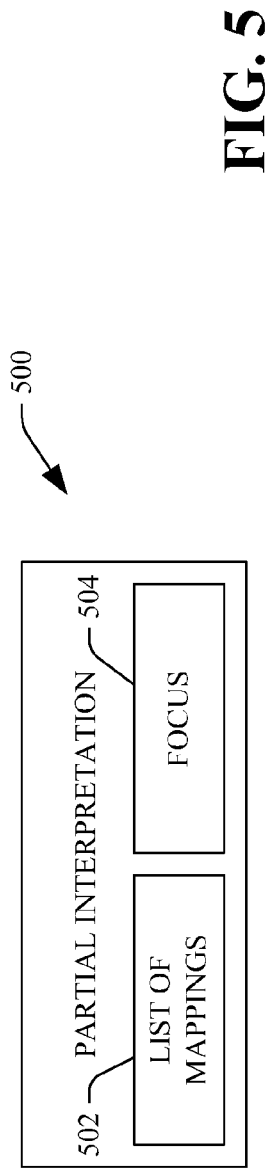
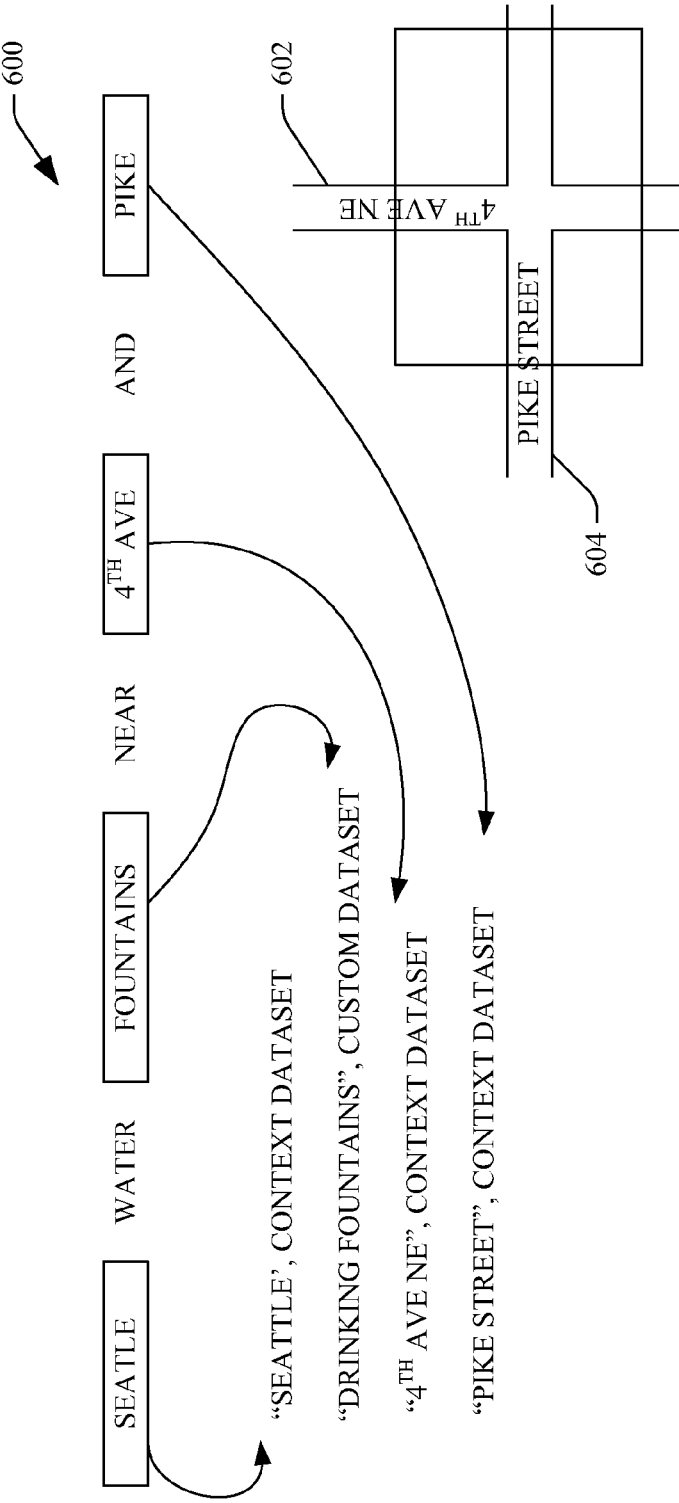

CUSTOM LOCAL SEARCH

BACKGROUND

Local search tools accessible by way of a browser are commonplace on the Internet. A user of such a tool directs the browser to a web page that corresponds to the local search tool by providing a Uniform Resource Locator (URL) that corresponds to the web page to the browser. The user then provides the local search tool with a location that is of interest to the user, which typically is the name of a city. Thereafter, the user can issue a query to the search tool, wherein the query is in the form of a name of a business/service or type of business/service (e.g., "pizza restaurants"). Typically, a search tool is configured to provide the user with a list of relevant organizations and corresponding contact data, including telephone numbers of the organizations, addresses of the organizations, etc. The search tool searches over and returns what is to be referred to herein as "yellow page data."

Typically, search tools receive yellow page data from consolidators who, in turn, generally rely upon specialized yellow page data collecting firms. The aggregated data is then considered as an aggregate pool of data on organizations, and searches are performed over this aggregate pool. The content of the yellow page data, therefore, is limited to that provided by the consolidators and/or yellow page data collecting firms. Additionally, the yellow page data is structured in such a manner that queries of a limited type and/or structure can be executed over such data. Still further, incorrect spelling of locations or services and/or otherwise imprecise queries can cause incorrect or no results to be returned to the user.

SUMMARY

The following is a brief summary of subject matter that is described in greater detail herein. This summary is not intended to be limiting as to the scope of the claims.

Described herein are various technologies pertaining to local search in general, and custom local search in particular. Local search refers to searching for certain entities/services/attributes over a particular geographic location, such as a city, a street, an intersection of streets, etc. Custom local search refers to searching for certain entities/services/attributes over a particular geographic region, wherein the entities/services/attributes are included in custom content. Custom content refers to content provided by an independent entity, such as an end user, a community group, or other suitable person/group that is typically not associated with providing yellow page data to search engines.

In an example, a community group may wish to provide a searchable site that maintains a user-provided list of pedestrian friendly features in a particular city. Such features may be, for instance, jogging trails, water fountains, playgrounds, etc. This data (referred to as "custom data" herein) may be provided to a system that facilitates searching over such data in a particular format—each entity (in this example) may comprise a shape and an attribute that describes the entity. The shape can be indicative of a geographic region pertaining to the entity (e.g., may be a polygon describing a location of the entity on a map). The system that receives the data may perform one or more preprocessing actions to cause the data to be searchable by others, including generating precomputed indexes and attribute footprints that describe the union of geometries of entities that share a particular attribute. The data can be placed in the form of a logically independent dataset, and the system can update the dataset (including the indexes and footprints) when additional data is received by the community group. The system described herein supports searching over multiple of these datasets, which can be referred to herein as "custom datasets".

The system can additionally support or have access to one or more contextual datasets, which can comprise detailed geographic data (e.g., street-level geographic data). This geographic data can be vector data, which may include precise geometry of streets, landmarks, localities, boundaries, etc. A free-form textual query configured to retrieve data pertaining to a geographic location can be received, and such textual query can be parsed such that different subsequences of tokens in the query are mapped to different sets of entities in the datasets (the custom dataset(s) and the contextual dataset (s)). The subsequences can be mapped to entities in the dataset(s) utilizing any suitable technique; however, subsequences of tokens may not be mapped simultaneously to different entities in different datasets. Spatial processing can be undertaken to determine a substantially optimal interpretation of the query, and custom local results can be returned to the issuer of the query.

In an example, the query may be "Seattle water fountains near $4^{th}$ ave. and Pike St." "Seattle" can map to boundary data in the contextual dataset, "$4^{th}$ ave." may map to certain vector data in the contextual dataset, and "Pike St." may map to other certain vector data in the contextual dataset. "Water fountains" may map to a set of entities that have an attribute "fountain" in the custom dataset. Using spatial processing (e.g., locating the intersection of $4^{th}$ Avenue and Pike Street in the contextual database), mapping of subsequences of query tokens to particular entities in the datasets can be undertaken, and results can be displayed to the issuer of the query on a display screen of a computer device.

Other aspects will be appreciated upon reading and understanding the attached figures and description.

BRIEF DESCRIPTION OF THE DRAWINGS

FIG. 2 is an illustration of an example contextual dataset and an example custom dataset.

FIG. 3 is a depiction of an example query.

FIG. 4 is a functional block diagram of an example system that facilitates performing custom local search.

FIG. 5 is a depiction of an example partial interpretation.

FIG. 6 is a depiction of an example partial interpretation.

DETAILED DESCRIPTION

Figure 1:
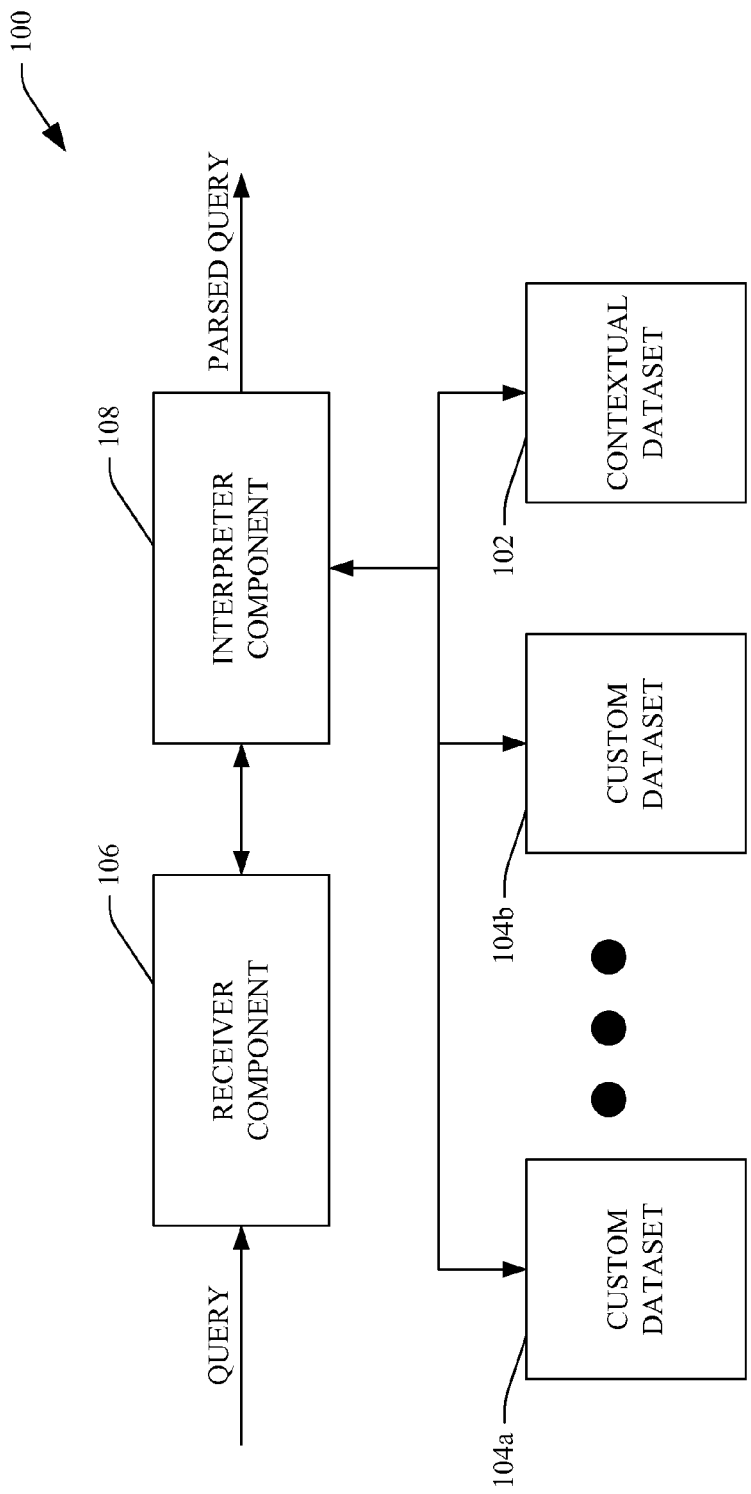
FIG. 1 is a functional block diagram of an example system that facilitates performing custom local search.

Various technologies pertaining to local search in general and custom local search in particular will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference to FIG. 1, an example system 100 that facilitates performance of local search as well as custom local search is illustrated. As used herein, the term "local search" can refer to performing a computer-based search over a particular geographic region for certain products, services, entities, attributes, or the like. "Custom local search" can refer to performing a computer-based search over a particular geographic region for certain products, services, entities, attributes, or the like, wherein searchable datasets are provided by end users or groups of end users (rather than a data collection firm). The system 100 thus supports execution of queries such as "Seafood restaurants near 4$^{th}$ Avenue and Pike Street" and "water fountains along walking trails in Redmond." Upon execution of the query, a list of products, services, entities, etc. pertaining to the query can be provided to the user on a display screen of a computing device, for instance. The results may be in the form of a listing, a map of the area that pertains to the query together with graphical indicia that represents entities pertaining to the query in the geographic region shown in the map, etc.

The system 100 comprises at least one contextual dataset 102, which can include detailed geographic data. For example, the contextual dataset 102 may comprise detailed geographic vector data, such as precise geometry of streets, landmarks, localities, boundaries, amongst other data. Furthermore, the contextual dataset 102 may include three-dimensional data (e.g., that describes buildings, rooms, . . . ). The system 100 can additionally include one or more custom datasets 104a-b (referred to herein individually and collectively as custom datasets 104) that can be generated by many different individuals or groups. The custom datasets 104 can include data pertaining to one or more geographic regions, wherein the data is provided by an end user or a group of end users. For example, a group of end users may wish to provide a list of pedestrian-friendly features in a city. In another example, an organization may wish to provide local search over sites in a database maintained by the organization, such that freeform text queries that are robust with respect to spelling variations can be executed, such as "Seattle Main Street sculptures" (Seattle and sculptures are misspelled).

The system 100 further includes a receiver component 106 that receives a query from an individual or program that wishes to perform a search over data in one or more of the custom datasets 104 with respect to location data in the contextual dataset 102. The query can be a free-form text query that comprises an indication of a geographic region pertaining to the query and a portion of the query that describes entities of interest. Some example forms that queries can take are shown in the following example queries: "Fort ruins along the river Ganges", "Ganesha Temples in Malleshwaram Bangalore", "Seattle kid friendly parks", "Seattle water fountains near 4$^{th}$ ave and Pike St", and "I-405 north webcams in Kirkland." Moreover, prior to processing the query, the query can be translated and/or transliterated. For instance, the query can be submitted in a first language and at least a portion of the query can be translated to a second language and thereafter processed.

Each term of the query can be referred to as a token. Thus, six tokens exist in the query "Fort ruins along the river Ganges" (Fort, ruins, along, the, river, Ganges). Subsequences of tokens of the query can be any contiguous combination of tokens in such a query. Thus, a subsequence of tokens may be "Fort Ruins". Furthermore, a subsequence of tokens may include a single token.

An interpreter component 108 is in communication with the receiver component 106 and can parse the query such that a first subsequence of tokens in the query is mapped to a first entity in the contextual dataset 102 and a second subsequence of tokens in the query is mapped to a second entity in one or more of the custom datasets 104. Tokens in the first subsequence of tokens are not included in tokens in the second subsequence of tokens. Entities in the datasets, as will be described in greater detail below, can include a shape that is indicative of location pertaining to the entity and one or more attributes that describe the entity. Thus, for instance, an entity representative of a water fountain in the custom dataset 104 may include a geographic shape (e.g., defined by latitude—longitude coordinates) and an attribute "drinking fountain". An entity representative of a street (e.g., Main Street in Seattle) can comprise a shape indicative of the location of the street (e.g., defined by a series of latitude—longitude coordinates) and an attribute "Main Street". Thus, continuing with these examples, if the query received by the receiver component is "Water Fountains on Main Street in Seattle", the interpreter component 108 can map the subsequence of tokens "Water Fountains" to at least one entity in one of the custom datasets 104 that has the attribute "drinking fountain" assigned thereto and the interpreter component 108 can map the subsequence of tokens "Main Street Seattle" to at least one entity in the contextual dataset 102 with the attribute "Main Street" assigned thereto.

The interpreter component 108, as will be described in greater detail below, can undertake such mapping numerous times with respect to various different subsequences of tokens and attributes in the contextual dataset 102 and the custom datasets 104. These different mappings can be referred to herein as query interpretations. The query interpretations can be refined and ranked. A most highly ranked query interpretation can be utilized to provide results to the issuer of the query. For example, the results may include a map of a region (e.g., from the contextual dataset 102) with graphical indicia thereon describing elements pertaining to the query (e.g., from the custom datasets 104). In another example, the results may include a list of entities corresponding to a certain geographic region. Other manners of organizing and presenting search results to the issuer of the query are contemplated and are intended to fall under the scope of the hereto-appended claims.

Turning now to FIG. 2, an example 200 of the contents of the contextual dataset 102 and one of the custom datasets 104 is illustrated. The custom dataset 104 can include a first entity 202 through an Nth entity 204. An entity can be representative of an object, service, or other type of entity that can be associated with a geographic location. The first entity 202 includes a shape 206, which can comprise one or more geometric primitives (points, polylines, polygons) specified in a coordinate system (e.g., latitude/longitude coordinates). The shape can be descriptive of the first entity 202, for example. The first entity 202 can also include a set of textual attributes 208. These attributes 208 can include category descriptors (e.g., such as "fort" or "ruins") and/or a name or names pertaining to the first entity 202 (e.g., "Golconda fort"). The first entity 202 also includes a unique identifier 210 that can identify the first entity 202 from amongst a plurality of entities. The custom dataset 104 comprises a plurality of entities, and each entity can comprise a shape, a set of attributes, and a unique identifier (206a, 208a, and 210a).

The custom dataset 104 may also comprise an index 211 and an attribute footprint 211a that can be computed offline (e.g., prior to execution of a query). For each attribute in the custom dataset 104, an attribute footprint can be computed, wherein an attribute footprint is an approximate representation of the union of geometries of all entities in the custom dataset 104 that share such attribute. The index 211 can comprise an entity lookup index that supports efficient lookup of multiple entities by attribute. The index 211 can also comprise fuzzy text index that supports approximate lookup of attributes (e.g., which allows misspellings to be taken into consideration).

The contextual dataset 102 also comprises a plurality of entities 212-214 (a first entity through a Pth entity). As described above, the contextual dataset 102 may be a relatively large dataset that comprises detailed street-level data. Each of the entities 212-214 in the contextual dataset 102 can comprise a shape 216, 216a, attributes 218, 218a, and unique identifiers 220, 220a. In the contextual dataset 102, the shapes 216 and 216a can describe shape of a street, monument, boundary line, etc. The attributes can be names, descriptors, or the like. Moreover, the contextual dataset 102 can comprise at least one attribute footprint 221 and an index 221a (similar to the index 211 and attribute footprint 211a in the custom dataset 104). As can be ascertained from reviewing FIG. 2, a query can desirably be executed over content in both the custom dataset 104 and the contextual dataset 102.

Now referring to FIG. 3, a diagram of a query 300 is depicted. The query 300 can be submitted by an individual or computing device in connection with performing a local search or a custom local search. The query 300 comprises a dataset selection 302, which indicates custom dataset(s) from amongst a plurality of custom datasets towards which the query is directed. For example, the dataset selection 302 can be ascertained based at least in part upon an identity of a website from which the query 300 is received. Thus, for instance, a heritage group may set up a website that facilitates custom local search with respect to ancient ruins, and data pertaining to the ancient ruins can be retained in a certain subset of custom datasets. When a query is issued, data can be associated with the query that indicates the website from which the query was issued, and thus can indicate the custom dataset that is desirably searched over. In another example, the dataset selection 302 can be inferred based at least in part upon content of the query 300. For instance, the query 300 may include the text "ancient ruins", and it can therefore be inferred that the query is directed towards a custom dataset pertaining to ancient ruins. In still yet another example, the dataset selection 302 can be an explicit selection of a custom dataset or datasets. Furthermore, the dataset selection 302 may also pertain to selection of a particular contextual dataset (if there are numerous contextual datasets) along with an indication of a custom dataset or datasets pertaining to the query 300.

The query 300 can also include text-query 304, which can include embedded references to attributes (names) from custom datasets and/or contextual datasets. These embedded references can be in any suitable order, and can possibly include misspellings and "nearness" operators, such as "x near y" or other suitable "nearness" operator. Furthermore, the text query 304 may include other operators, such as "along", "within X minutes of", "behind", or other operators that are descriptive in terms of geographic location.

The query 300 can also include a geometric scope 306, which indicates a geographic region pertaining to the query 300. For example, the geometric scope 306 could be or include a name of a city, a name of a state, a name of a street or intersection, a name of a boundary, a name of a monument that pertains to a certain geographic region, etc. In another example, the geometric scope 306 can be inferred based upon a current view of a map provided to the user.

With reference now to FIG. 4, the interpreter component 108 is shown in greater detail. The interpreter component 108 can include a query interpreter component 402 that can perform query interpretation. Generally, query interpreter component 402 can be configured to extract entity names and attributes from a received query while computing an approximate region of interest. The query interpreter component 402 can generate multiple query interpretations for a query.

The interpreter component 108 can further include a refinement component 404 that can perform query interpretation refinement. During query interpretation refinement, the refinement component 404 can identify specific sets of entities that have attributes (that were identified in the previous phase) and that intersect the approximate region of interest identified in the previous phase. This information can be used to construct precise regions of interest, taking user-supplied per-query geometric parameters into account.

The interpreter component 108 can additionally comprise a ranker component 406 that ranks multiple possible refined query interpretations. The ranker component 406 can take into consideration various factors including textual similarity between terms in the query with terms of matched entities as well as factors computed from specific entities that make up a result set. Operation of the query interpreter component 402, the refinement component 404, and the ranker component 406 are now described in greater detail.

With more detail pertaining to the query interpreter component 402, such component 402 can receive a query and can output one or more partial query interpretations (PIs). Turning briefly to FIG. 5, an example depiction of a partial interpretation 500 is illustrated. The PI comprises a list of mappings 502, which are mappings from subsequences of tokens in the query to attributes (e.g., names or categories) in one or more datasets. The PI 500 also includes an approximate region of interest, which can be referred to herein as the Focus 504 of the PI. Thus, the PI (generated by the query interpreter component 402) comprises mappings between query subsequences and sets of entities that share an attribute.

Referring now to FIG. 6, an example depiction 600 of a PI of the query "Seattle water fountains near $4^{th}$ ave and Pike" is illustrated. It can be discerned that mappings in the PI may include inexact text matches. For instance, in the example PI, "Seattle" (misspelled) maps to the attribute "Seattle" in the contextual dataset 102 (FIG. 1), while "fountain" maps to the attribute "drinking fountain" in the custom dataset 104 (which may be one of many custom datasets). Further, some terms in the query remain unmapped, such as "water" ("water fountain" is not an attribute while "drinking fountain" is an attribute). A focus 602 of the PI comprises the intersection of $4^{th}$ Avenue NE 604 and Pike Street 606 in Seattle, Wash.

Returning to FIG. 4, the query interpreter component 402 can operate as follows to compute PIs. The query interpreter component 402 can receive the query as input and can have access to the contextual dataset 102 and the custom datasets 104. The query comprises a sequence of tokens, $(q_1, q_2, q_3, \ldots q_n)$. The query interpreter component 402 can also receive an optional initial spatial region (F), and if such region is specified, the search can be restricted to the region. The query interpreter component 402 utilizes spatial processing (instead of text-based parsing techniques) to determined PIs. The query interpreter component 402 can explore many possible mappings between subsequences and attributes, and can use spatial intersection operations to prune non-viable combinations.

A query subsequence $q_{i-j}$ considered by the query interpreter component 402 can represent a list of contiguous tokens $(q_i, q_{i+1}, \ldots q_j)$ of the query Q. The query interpreter component 402 can generate a plurality of lists of what can be referred to herein as "match candidates" (MCs), one from each dataset considered (e.g., one from one or more of the custom datasets 104 each and one from the contextual dataset 102). Each MC ($q_{i-j}$, name, D) maps query subsequence $q_{i-j}$ to an attribute name in the dataset D. MCs are candidate PI mappings, such as that shown in FIG. 5. The MC lists can be obtained by looking up the fuzzy index corresponding to the database, wherein any suitable fuzzy/approximate text lookup technology may be used.

The query interpreter component 402 may then select a MC pertaining to one of the custom datasets 104, which can be referred to as CustMC. The query interpreter component 402 may then perform a filter operation with respect to MCs pertaining to the contextual dataset 102, such that MCs pertaining to the contextual dataset 102 that are compatible with the CustMC are retained (the uncompatible MCs are not considered). To be compatible, the CustMC and a MC pertaining to the contextual dataset 102 spatially overlap and are derived from non-overlapping subsequences of the query Q. This filtering causes an anchored MC list to be generated for each CustMC (the anchored MC list comprises MCs pertaining to the contextual dataset 102 that are compatible with CustMC).

The query interpreter component 402 can utilize the anchored MC list in connection with generating a PI. Given the anchored MC list, an algorithm can be called that starts with an empty PI, an empty solution set pertaining to the query, and the approximate region of interest (the focus). The focus can be a large region (e.g., the whole world) or a smaller region provided by the issuer of the query. The query interpreter component 402 can order the MCs in the anchored MC list in order of decreasing "promise" (e.g., in order of decreasing fuzzy-text match score). In other words, MCs in the anchored MC list with attributes that match more closely with subsequences in the query can be placed earlier on the list. It is to be understood that other orderings are contemplated and intended to fall under the scope of the hereto-appended claims.

Thereafter, each MC in the anchored MC list can be added to the current PI (the initially empty PI). For each MC in the MC anchor list, the query interpreter component 402 can compute a new partial interpretation that is the addition of the current MC in the MC anchor list being considered, a new focus that is the spatial intersection of the footprint of the current MC and the old focus, and a new MC anchor list with incompatible MCs filtered. Computation of the spatial intersection can result in a more narrow focus. The query interpreter component 402 computes the new MC anchor list by receiving the MC anchor list and removing MCs that are either textually incompatible or spatially incompatible with the current PI. MCs are spatially incompatible if their footprints do not overlap with the newly computed focus. Two MCs are textually incompatible if their matched subsequences include a common token or tokens from the input query. If the new list of anchored MCs is empty, the partial interpretation cannot be more fully expanded, implying that a viable interpretation has been discovered. This partial interpretation can be added to the solution set of possible partial interpretations of the query. If the new list of anchored MCs includes additional MCs, then a next MC can be added to the current PI and the process can repeat. Moreover, this process can repeat for each MC in custom datasets pertaining to the query. Therefore, the query interpreter component 402 can compute a plurality of PIs with respect to the query.

Figure 7:
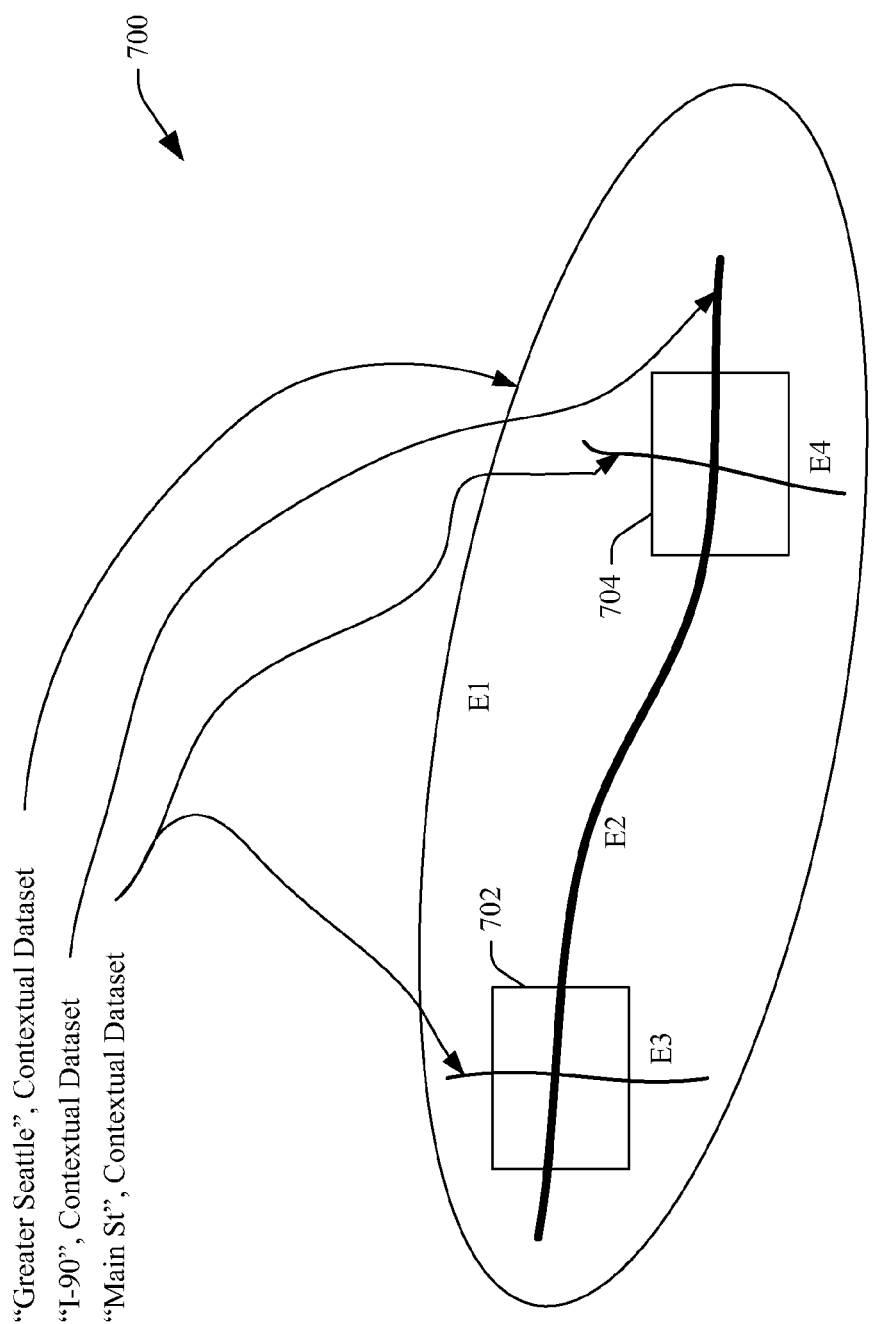
FIG. 7 is a depiction of example interpretation refinements.

The refinement component 404 can receive the PIs and output query refinements corresponding to the PIs. Specifically, the refinement component 404 can undertake the refinements by identifying entities that make up a refined interpretation. In a refined interpretation, each mapping references a specific entity (and there may be multiple subsets of entities in cases that more than one entity corresponds to an attribute). Referring briefly to FIG. 7, an example mapping 700 between attributes and entities is illustrated. FIG. 7 illustrates how multiple sets of refined interpretations can derive from a single PI. As shown, the mapping 700 includes mappings between attributes in the contextual dataset "Greater Seattle", "I-90", and "Main St" and entities in the contextual dataset 102. In this example, there are two entities named "Main St" (E3 and E4), one entity for "Greater Seattle" (E1) and one entity for "I-90" (E2). The final focus is a discontiguous region that covers two regions 702 and 704 where three entities with the aforementioned attributes overlap. This PI is thus associated with two refined interpretations, $I_1$ and $I_2$, which correspond to the two distinct entity triples that overlap: (E2, E3, E1) and (E2, E4, E1). Tuples (E2, E3) and (E2, E4) can be called out as "intersectors". Other entities associated with a refined interpretation (if any), can be referred to as "containers". In the example of FIG. 7, there is a single container entity, E1, with an attribute "greater Seattle"). Generally, these entities can be represented in a refined interpretation as ((E1, E2, E3, . . . , Ei, . . . , EN), E1, E2, E3, . . . , Ej, . . . EM), where the $E_i$s are intersectors and the $E_j$s are containers.

The refinement component 404 can generate refined interpretations as follows. First, the refinement component 404 can build a list of entities, one list for each attribute in the PI. The refinement component 404 can construct each list by looking up entities with the particular attribute from its corresponding dataset and which are spatially within the focus of the PI. The refinement component 404 can use the precomputed spatial (attribute footprint) index to generate such a list. The refinement component 404 can then accumulate subsets of entities from the lists of entities previously generated by taking one entity from each list. Each subset includes entities that mutually overlap spatially—the refinement component 404 can detect overlapping entities through utilization of shape information associated with individual entities. The refinement component 404 can also compute a final region of interest pertaining to the query. This can be undertaken by intersecting the shapes of the intersecting entities and growing the resultant shape by a query-specific boundary width. In another example, the region of interest can be computed by growing the final focus by a per-query boundary width. Thereafter, the refinement component 404 can look up custom dataset entities given the computed region of interest. The refinement component 404 can locate candidate unique identifiers from all datasets (including custom datasets) involved in the query. The refinement component 404 may then filter such list, pruning out entities that lie outside the computed region of interest. In another example, the region of interest can be utilized directly to lookup a separate spatial database (one maintained per custom dataset) to retrieve unique identifiers.

The interpreter component 108 can also include a ranker component 406 that ranks refined interpretations output by the refinement component 404. For instance, the ranker component 406 can utilize heuristics that take into consideration a plurality of factors when ranking refined interpretations, including but not limited to a weighted edit-distance score between query subsequences and matched attributes, the count of matched attributes to query subsequence pairs, the fraction of a query that is unmatched, etc. Of course, the ranker component 506 can utilize any suitable technologies in connection with ranking refined interpretations.

The output provided to a user can comprise entities corresponding to a most highly ranked refined interpretation. That is, the set of entities returned to the user can include entities from the custom dataset that fall within the region of interest for the query. The user can also receive contextual data from the contextual dataset that provides context for the entities from the custom dataset.

Figure 8:
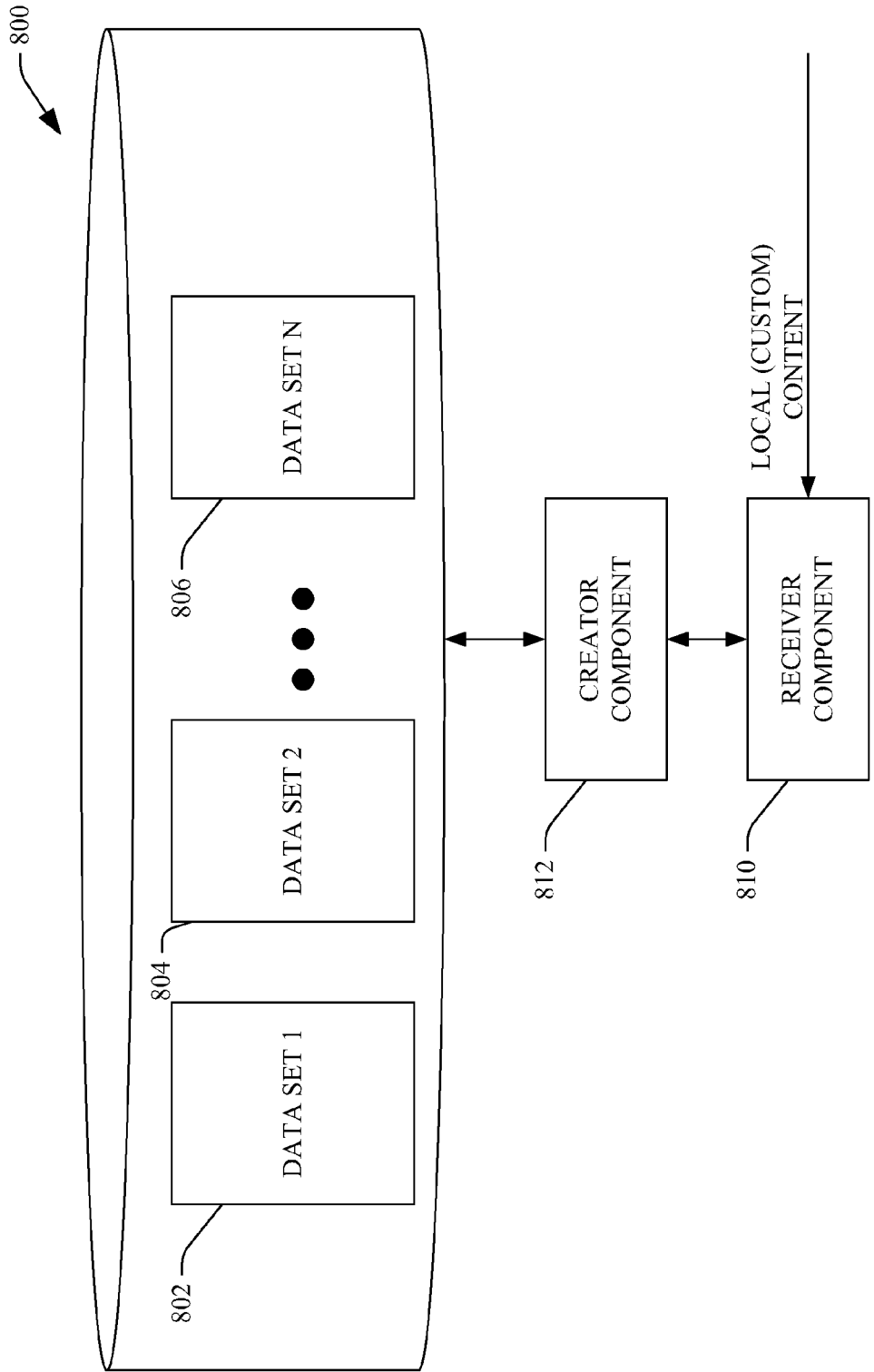
FIG. 8 is a functional block diagram of an example system that facilitates creating/updating custom datasets.

With reference now to FIG. 8, an example system 800 that facilitates generating and maintaining custom datasets that can be utilized in connection with custom local searches is illustrated. The system 800 comprises a data repository 802, which can be a server or a series of servers that are configured to retain at least one contextual dataset and a plurality of custom datasets. Such datasets are shown in FIG. 8 as datasets 804-808. The datasets 804-808 can each include entities, attribute footprints, indexes, and the like. The datasets 804-808 in the data repository 802 can be searched over as described above.

The system 800 also includes a receiver component 810 that can receive new custom datasets from an end user or group of end users and/or updates to one or more of the datasets 804-808 in the data repository 802. In an example, an end user can access a map application through utilization of a browser, and select (using a mouse) locations on the map that pertain to certain entities. Furthermore, the map application may have a graphical user interface associated therewith that is configured to receive attributes from the end user that describe the entities. The end user may then make a selection (e.g., select a push-button shown on a web page) that causes data to be uploaded from a client computing device used by the end user.

A creator component 812 can receive data uploaded by the end user and can cause a new dataset to be created in the data repository 802. The creator component 812 can allocate space in the data repository 802 to store a new dataset or to update an existing dataset. The creator component 812 can compute a fuzzy text index as well as a spatial footprint for attributes/entities in the new/updated dataset. The spatial footprint(s) and indexes can be stored in connection with their respective datasets for utilization during query interpretation.

Figure 9:
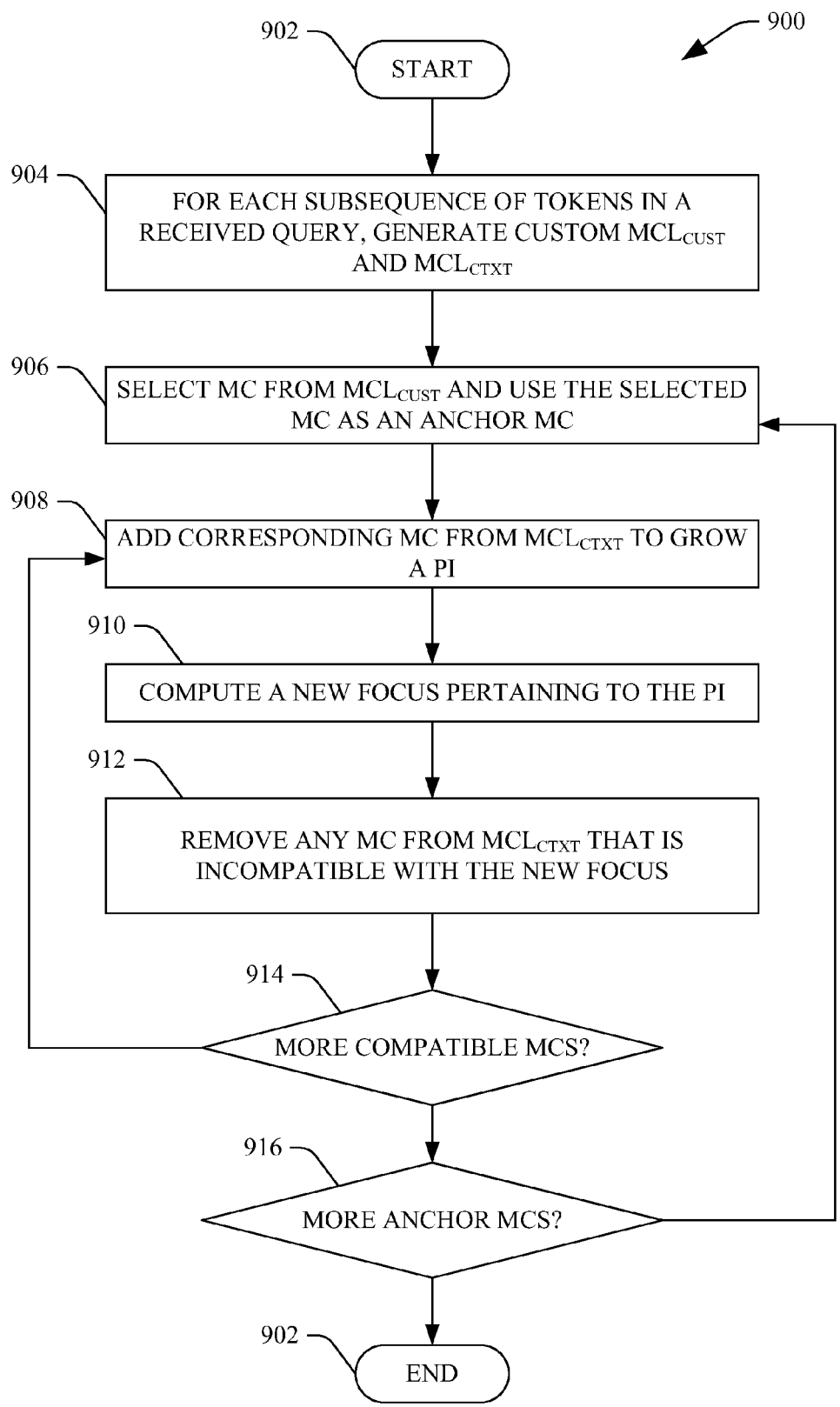
FIG. 9 is a flow diagram that illustrates an example methodology for generating partial query interpretations.
Figure 10:
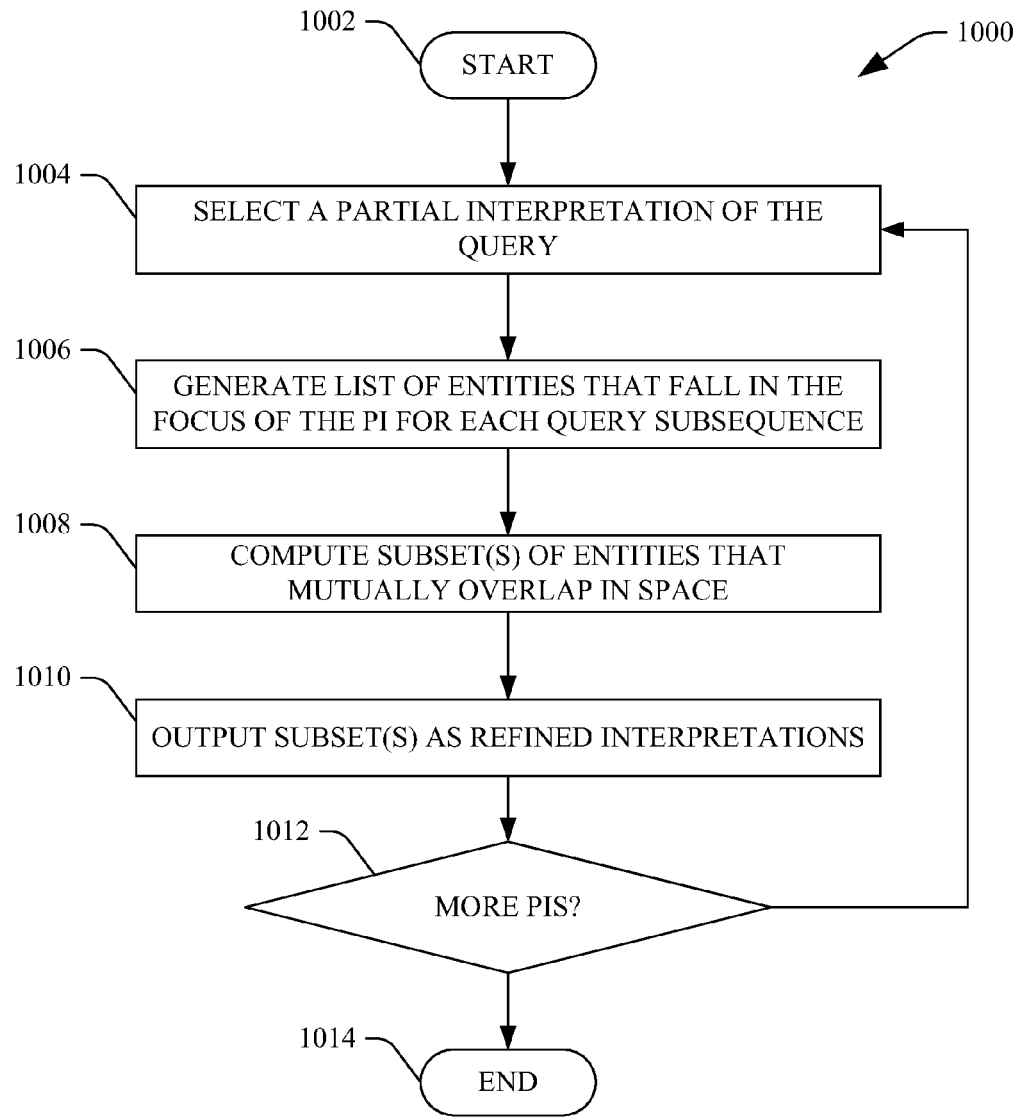
FIG. 10 is a flow diagram that illustrates an example methodology for generating query interpretation refinements.

With reference now to FIGS. 9-10, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like.

Referring now to FIG. 9, a methodology 900 that facilitates computing a plurality of partial interpretations of a query is illustrated. As described above, the query can be configured to perform a custom local search, such that portions of the query pertain to a contextual dataset and portions of the query pertain to one or more custom datasets. The methodology 900 begins at 902, and at 904 for each subsequence of tokens of the received query match candidate (MC) lists are generated. As described above, a contextual database can include contextual entities (with shapes and attributes assigned thereto) and a custom database can include custom entities (with shapes and attributes assigned thereto). The contextual database and custom database can also have a fuzzy lookup index corresponding thereto. Generating the match candidate lists can include mapping subsequences of tokens of the queries to attributes corresponding to entities in the aforementioned datasets, which can be undertaken through utilization of the fuzzy lookup index (which can account for misspellings, spelling variations, etc.). The list of match candidates corresponding to the custom dataset can be referred to as $MCL_{CUST}$ and the list of match candidates corresponding to the contextual dataset can be referred to as $MCL_{CTXT}$.

At 906, a MC is selected from $MCL_{CUST}$ and used as an anchor MC. Selection of this MC can be the beginning of a partial interpretation. A compatible MC from $MCL_{CTXT}$ can then be selected to grow the PI at 908. A compatible MC, in an example, can be an MC that is textually non-overlapping with the anchor MC. At 910, once the compatible MC has been selected, a new focus can be generated, wherein the new focus can be a spatial intersection of an existing focus and the spatial footprint of the compatible MC. An initial focus can be a large region or a smaller region inferred from content of the query or a current view of a map provided to a user.

At 912, MCs in $MCL_{CTXT}$ that are incompatible with the current partial interpretation can be labelled such that they are not considered for the current partial interpretation of the query. In this example, incompatible can refer to MCs that have textual overlap with any MC in the current partial interpretation as well as MCs that do not spatially intersect with the newly generated focus.

At 914, a determination is made if there are any more MCs in $MCL_{CTXT}$ to be considered for the current partial interpretation (if there are any MCs that are compatible with the current partial interpretation). If there are additional MCs in $MCL_{CTXT}$ that are compatible with the current partial interpretation, then the methodology 900 returns to 908.

If there are no more MCs in $MCL_{CTXT}$ to be considered for the current partial interpretation, such partial interpretation can be output as a partial interpretation for the query, and the methodology can proceed to 916. Additionally or alternatively, a recursive depth-first exploration can be undertaken as described above, where a MC is dropped from the MCList. At 916, a determination is made regarding whether there are any other MCs in $MCL_{CUST}$ to be considered as an anchor MC. If there are additional MCs in $MCL_{CUST}$ to be considered as anchor MCs, then the methodology 900 returns to 906. If there are no additional MCs in $MCL_{CUST}$ to consider, then the methodology 900 completes at 918.

With reference now to FIG. 10, an example methodology 1000 that can be utilized to generate refined query interpretations (refinements of partial interpretations) is illustrated. The methodology 1000 starts at 1002, and at 1004 a partial interpretation of the query is selected (e.g., from amongst a plurality of possible partial interpretations). At 1006, for each mapped attribute, a list of entities that fall within the final focus of the partial interpretation is generated. At 1008, subset(s) of entities in the list of entities that mutually overlap in space are generated. Such subset(s) can be generated by reviewing a spatial footprint corresponding to the entities, which can be precomputed. This can be undertaken, for instance, by computing a geometric intersection between a current focus and an entity, and then analyzing the refined focus. If the refined focus is non-empty, then the entity lies in the refined focus, and such entity can be added to a refined interpretation of the partial interpretation.

At 1010, the subset(s) of entities are output as refined interpretations. At 1012, a determination is made regarding whether any additional partial interpretations are to be refined. If there are additional partial interpretations, then the methodology 1000 returns to 1004. If there are no additional partial interpretations, then the methodology 1000 completes at 1012.

Figure 11:
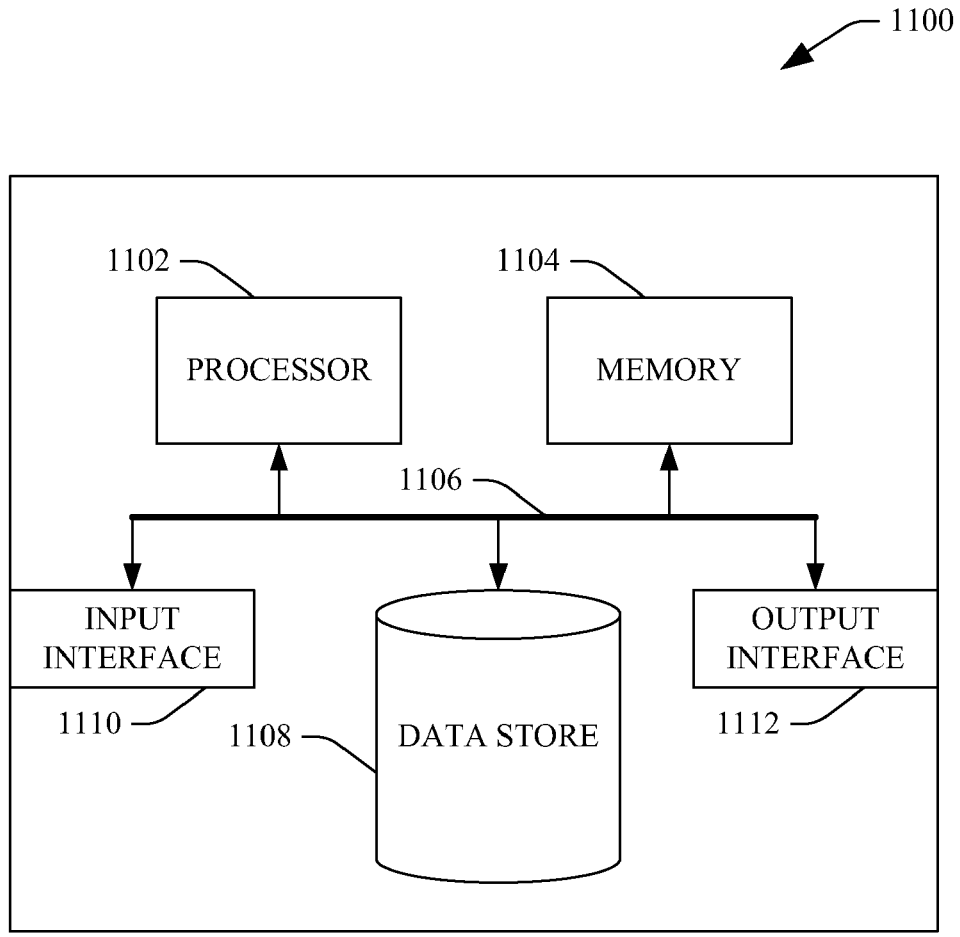
FIG. 11 is an example computing system.

Now referring to FIG. 11, a high-level illustration of an example computing device 1100 that can be used in accordance with the systems and methodologies disclosed herein is illustrated. For instance, the computing device 1100 may be used in a system that supports performing local search. In another example, at least a portion of the computing device 1100 may be used in a system that supports performing custom local search. The computing device 1100 includes at least one processor 1102 that executes instructions that are stored in a memory 1104. The instructions may be, for instance, instructions for implementing functionality described as being carried out by one or more components discussed above or instructions for implementing one or more of the methods described above. The processor 1102 may access the memory 1104 by way of a system bus 1106. In addition to storing executable instructions, the memory 1104 may also store contextual data, custom data, match candidates, partial interpretations, etc.

The computing device 1100 additionally includes a data store 1108 that is accessible by the processor 1102 by way of the system bus 1106. The data store 1108 may include executable instructions, contextual datasets, custom datasets, pre-computed indexes, query token subsequences, etc. The computing device 1100 also includes an input interface 1110 that allows external devices to communicate with the computing device 1100. For instance, the input interface 1110 may be used to receive instructions from an external computer device, from a user, etc. The computing device 1100 also includes an output interface 1112 that interfaces the computing device 1100 with one or more external devices. For example, the computing device 1100 may display text, images, etc. by way of the output interface 1112.

Additionally, while illustrated as a single system, it is to be understood that the computing device 1100 may be a distributed system. Thus, for instance, several devices may be in communication by way of a network connection and may collectively perform tasks described as being performed by the computing device 1100.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method comprising:
receiving a query that is configured by an issuer of the query to perform a local search, wherein the local search is performed over a first dataset and a second data set, wherein the first dataset comprises a first entity and the second dataset comprises a second entity, and wherein the query comprises a first token and a second token;
parsing the query such that the first token of the query is mapped to the first entity in the first dataset and the second token of the query is mapped to the second entity in the second dataset; and
returning search results based at least in part upon the parsing of the query, wherein the method is executed by a processor of a computing device.

2. The method of claim 1, wherein the first dataset is a custom dataset, wherein the custom dataset comprises a plurality of entities generated by an end user, and wherein the plurality of entities comprise attributes that describe the plurality of entities and shapes pertaining to the plurality of entities.

3. The method of claim 2, wherein the second dataset comprises street-level vector data.

4. The method of claim 3, wherein parsing the query comprises determining an approximate geographic region pertaining to the query.

5. The method of claim 4, further comprising determining the approximate geographic region pertaining to the query based at least in part upon mapping the second token of the query to the second entity in the dataset.

6. The method of claim 1, wherein parsing the query comprises identifying which words and phrases in the query correspond to attributes in the first dataset and the second dataset.

7. The method of claim 1, wherein parsing the query comprises generating a plurality of different partial interpretations of the query.

8. The method of claim 7, wherein each partial interpretation in the plurality of partial interpretations comprises a set of mappings between tokens in the query to attributes in the first dataset and the second dataset and an approximate region of interest pertaining to the query.

9. The method of claim 8, further comprising refining at least one partial interpretation, wherein the at least one partial interpretation is refined by way of spatial processing.

10. The method of claim 9, wherein the at least one partial interpretation is refined by determining that an entity in the first dataset spatially corresponds with a region of interest pertaining to the query.

11. The method of claim 10, wherein the region of interest is altered based at least in part upon a geographic overlap of a previous region of interest and an entity.

12. The method of claim 1, wherein the query is received in a first language, and further comprising translating at least a portion of the query to a second language.

13. The method of claim 1, wherein the query is a free-form text query that comprises misspelled terms, erroneous terms, out of order terms, or valid but wrong terms.

14. A system that facilitates custom local search, the system comprising:
a processor; and
a memory that comprises a plurality of components that are executed by the processor, the plurality of components comprising:
a receiver component that receives a query from a user, wherein the query comprises a plurality of tokens, wherein the query is configured to retrieve custom content with respect to a particular geographic region, and wherein the query comprises a first token and a second token; and
an interpreter component that parses the query such that the first token is mapped to a first entity in a first dataset and the second token is mapped to a second entity in a second dataset, wherein the first dataset is a custom dataset that comprises custom data provided by an end user and the second dataset is a contextual dataset that comprises street-level geographic data.

15. The system of claim 14, wherein the first entity comprises a shape that describes a geographic region pertaining to the first entity, an attribute that describes the first entity, and a unique identifier that identifies the entity.

16. The system of claim 14, wherein the query comprises at least one token that is indicative of a custom dataset amongst a plurality of custom datasets to which the query pertains, free-form text, and at least one token that is indicative of geographic scope pertaining to the query.

17. The system of claim 14, wherein the interpreter component comprises a query interpreter component that outputs multiple partial interpretations of the query, wherein each partial interpretation comprises a list of mappings between subsequences of tokens of the query and sets of entities in the custom dataset and the contextual dataset and an approximate region of interest pertaining to the partial query interpretation.

18. The system of claim 17, wherein the interpreter component further comprises a refinement component that refines at least one of the partial interpretations, wherein the refinement component modifies the approximate region of interest pertaining to the partial query interpretation when refining the at least one of the partial interpretations.

19. The system of claim 18, wherein the interpreter component further comprises a ranker component that ranks refined partial interpretations.

20. A computer-readable data storage device comprising instructions that, when executed by a processor, cause the processor to perform acts comprising:
- receiving a query, wherein the query comprises a plurality of tokens, wherein the query is configured to execute over one or more custom datasets and one or more contextual datasets;
- generating a partial interpretation of the query, wherein generating the partial interpretation of the query comprises mapping a first subsequence of the tokens to a first attribute in the custom dataset and mapping a second subsequence of the tokens to a second attribute in the contextual dataset;
- refining the partial interpretation of the query to generate a refined interpretation, wherein refining the partial interpretation comprises mapping a first entity in the custom dataset that has the first attribute to the first subsequence of the tokens and mapping a second entity in the contextual dataset that has the second attribute to the second subsequence of tokens; and
- causing graphical items representative of the first entity and the second entity to be displayed on a display screen of a computing device.

* * * * *